(12) United States Patent
Ryu et al.

(10) Patent No.: US 8,984,475 B2
(45) Date of Patent: Mar. 17, 2015

(54) APPARATUS AND METHOD FOR GENERATING CODE OVERLAY

(75) Inventors: Soo-Jung Ryu, Hwaseong-si (KR); Choon-Ki Jang, Anyang-si (KR); Jaejin Lee, Seoul (KR); Bernhard Egger, Seoul (KR); Young-Chul Cho, Yongin-si (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 556 days.

(21) Appl. No.: 13/045,576

(22) Filed: Mar. 11, 2011

(65) Prior Publication Data

US 2011/0238945 A1   Sep. 29, 2011

(30) Foreign Application Priority Data

Mar. 26, 2010   (KR) ........................ 10-2010-0027515

(51) Int. Cl.
  *G06F 9/44*    (2006.01)
  *G06F 9/45*    (2006.01)
  *G06F 12/02*   (2006.01)

(52) U.S. Cl.
  CPC .................................. *G06F 12/0223* (2013.01)
  USPC ............................ 717/106; 717/144; 717/154

(58) Field of Classification Search
  None
  See application file for complete search history.

(56) References Cited

U.S. PATENT DOCUMENTS

| | | | |
|---|---|---|---|
| 5,175,830 A | | 12/1992 | Sherman et al. |
| 5,787,284 A | * | 7/1998 | Blainey et al. ............... 717/144 |
| 5,862,385 A | * | 1/1999 | Iitsuka ........................... 717/144 |
| 5,889,999 A | * | 3/1999 | Breternitz et al. ............ 717/158 |
| 6,064,819 A | * | 5/2000 | Franssen et al. .............. 717/144 |
| 6,070,009 A | * | 5/2000 | Dean et al. .................... 717/154 |
| 6,438,672 B1 | | 8/2002 | Fischer et al. |
| 6,578,123 B1 | | 6/2003 | Austin et al. |
| 7,043,717 B2 | | 5/2006 | Matsumoto et al. |
| 7,389,501 B1 | * | 6/2008 | Farouki et al. ................ 717/154 |
| 7,478,376 B2 | * | 1/2009 | O'Brien et al. ............... 717/149 |

(Continued)

FOREIGN PATENT DOCUMENTS

| | | |
|---|---|---|
| KR | 10-2003-0091640 | 12/2003 |
| KR | 10-2007-0040007 | 4/2007 |

OTHER PUBLICATIONS

Amit Arvind Pabalkar, A Dynamic Code Mapping Technique for Scratchpad Memories in Embedded Systems, [Online] Dec. 2008, [Retrieved from the Internet] <http://aviral.lab.asu.edu/temp/publications/thesis/AmitThesis.pdf> 56 pages.*

(Continued)

*Primary Examiner* — Thuy Dao
*Assistant Examiner* — Ravi K Sinha
(74) *Attorney, Agent, or Firm* — NSIP Law

(57) ABSTRACT

Provided is an apparatus and method for generating code overlay capable of minimizing the number of memory copies. A static temporal relationship graph (STRG) is generated in which each of functions of a program corresponds to a node of the STRG and a conflict miss value corresponds to an edge of the STRG. The conflict miss value is the maximum number of possible conflict misses between functions. Overlay is generated by selecting at least one function from the STRG, calculating an allocation cost for each region of a memory to be given when the at least one selected function is allocated, and allocating the at least one selected function to a region that has the smallest allocation cost.

21 Claims, 14 Drawing Sheets

(56) References Cited

U.S. PATENT DOCUMENTS

| | | | |
|---|---|---|---|
| 7,581,213 B2* | 8/2009 | Peri et al. | 717/144 |
| 7,765,534 B2* | 7/2010 | Archambault et al. | 717/154 |
| 8,032,873 B2* | 10/2011 | O'Brien et al. | 717/149 |
| 8,141,059 B2* | 3/2012 | Ding et al. | 717/144 |
| 8,434,074 B2* | 4/2013 | Janczak et al. | 717/144 |
| 2002/0188929 A1 | 12/2002 | Cyran et al. | |
| 2004/0083455 A1 | 4/2004 | Gschwind et al. | |
| 2004/0205697 A1* | 10/2004 | Hylands et al. | 717/106 |
| 2006/0221747 A1 | 10/2006 | Slavin et al. | |
| 2007/0180441 A1* | 8/2007 | Ding et al. | 717/154 |
| 2007/0250827 A1* | 10/2007 | Ohyama et al. | 717/162 |
| 2008/0028377 A1* | 1/2008 | Dembo et al. | 717/144 |
| 2008/0196017 A1* | 8/2008 | Ritzau et al. | 717/154 |
| 2009/0158019 A1* | 6/2009 | O'Brien et al. | 712/245 |
| 2009/0282386 A1* | 11/2009 | Moir et al. | 717/106 |
| 2010/0199257 A1* | 8/2010 | Biggerstaff | 717/106 |

OTHER PUBLICATIONS

Cytron, Ron, and Paul G. Loewner, An automatic overlay generator, [Online] IBM journal of research and development 30.6 (1986), [Retrieved from the Internet] <http://ieeexplore.ieee.org/stamp/stamp.jsp?tp=&arnumber=5390163> pp. 603-608.*

Lian Li, Hui Feng, and Jingling Xue; Compiler-directed scratchpad memory management via graph coloring, [Online] 2009, ACM Trans. Archit. Code Optim. 6, 3, Article 9 (Oct. 2009), 17 pages [Retrieved from the Internet] < http://doi.acm.org/10.1145/1582710.1582711>.*

Manish Verma, Lars Wehmeyer, and Peter Marwedel; Dynamic overlay of scratchpad memory for energy minimization, [Online] 2004, In Proceedings of the 2nd IEEE/ACM/IFIP international conference on Hardware/software codesign and system synthesis, [Retrieved from the Internet] <http://doi.acm.org/10.1145/1016720.101> pp. 104-109.*

Manish Verma, Lars Wehmeyer, and Peter Marwedel, Cache-Aware Scratchpad Allocation Algorithm, [Online] 2004, In Proceedings of the conference on Design, automation and test in Europe—vol. 2, vol. 2. IEEE Computer Society, Washington, DC, USA, [Retrieved from the Internet] <http://delivery.acm.org/10.1145/970000/969148/208521264.pdf> 6 pages.*

Zhong-Ho Chen and Alvin W. Y. Su; A hardware/software framework for instruction and data scratchpad memory allocation, [Online] 2010, ACM Trans. Archit. Code Optim. 7, 1, Article 2 (May 2010), 27 pages. [Retrieved from the Internet] <http://doi.acm.org/10.1145/1736065.1736067>.*

* cited by examiner

| FUNCTION | Control Flow Graph(CFG) | Path Expression |
|---|---|---|
| M |  | $P_M = ((M \cdot A \cdot M \cdot (M \cdot B \cdot M) | \varepsilon))^* \cdot M \cdot E \cdot M$ |
| A | ⋮ | ⋮ |
| B |  | $P_B = (B \cdot C \cdot B \cdot E \cdot B \cdot (B \cdot E \cdot B)^*)^* | \varepsilon$ |
| C |  | $P_C = C \cdot D \cdot C$ |
| D | ⋮ | ⋮ |

$$P_M = (M \cdot A \cdot M \cdot ((M \cdot B \cdot M)|\varepsilon))^* \cdot M \cdot E \cdot M$$
$$P_{A,B} = (\varepsilon \cdot A \cdot \varepsilon((\varepsilon \cdot B \cdot \varepsilon)|\varepsilon))^* \varepsilon \cdot \varepsilon \cdot \varepsilon$$
$$= (A \cdot (B|\varepsilon))^*$$

FIG. 2E

| n | Operations |
|---|---|
| Leaf | $nullable(n) = \begin{cases} true & \text{if } n = \varepsilon \\ false & \text{otherwise} \end{cases}$<br>$firstpos(n) = \begin{cases} \{x\} & \text{if } n = x \\ \{y\} & \text{if } n = y \\ \varphi & \text{otherwise} \end{cases}$<br>$lastpos(n) = \begin{cases} \{x\} & \text{if } n = x \\ \{y\} & \text{if } n = y \\ \varphi & \text{otherwise} \end{cases}$<br>$wcnc(n) = 0$ |
| $n_l \| n_r$ | $nullable(n) = nullable(n_l) \vee nullable(n_r)$<br>$firstpos(n) = firstpos(n_l) \cup firstpos(n_r)$<br>$lastpos(n) = lastpos(n_l) \cup lastpos(n_r)$<br>$wcnc(n) = MAX(wcnc(n_l), wcnc(n_r))$ |
| $n_l \cdot n_r$ | $nullable(n) = nullable(n_l) \wedge nullable(n_r)$<br>$firstpos(n) = \begin{cases} firstpos(n_l) \cup firstpos(n_r) & \text{if } nullable(n_l) \\ firstpos(n_l) & \text{otherwise} \end{cases}$<br>$lastpos(n) = \begin{cases} lastpos(n_r) \cup lastpos(n_l) & \text{if } nullable(n_r) \\ lastpos(n_r) & \text{otherwise} \end{cases}$<br>$wcnc(n) = \begin{cases} wcnc(n_l) + wcnc(n_r) + 1 & \text{if } (x \in lastpos(n_l) \wedge y \in firstpos(n_r)) \\ & \vee (y \in lastpos(n_l) \wedge x \in firstpos(n_r)) \\ wcnc(n_l) + wcnc(n_r) & \text{otherwise} \end{cases}$ |
| $n_l^*$ | $nullable(n) = true$<br>$firstpos(n) = firstpos(n_l)$<br>$lastpos(n) = lastpos(n_l)$<br>$wcnc(n) = \begin{cases} wcnc(n_l) \times c + c - 1 & \text{if } (x \in lastpos(n_l) \wedge y \in firstpos(n_r)) \\ & \vee (y \in lastpos(n_l) \wedge x \in firstpos(n_r)) \\ wcnc(n_l) \times c & \text{otherwise} \end{cases}$ |

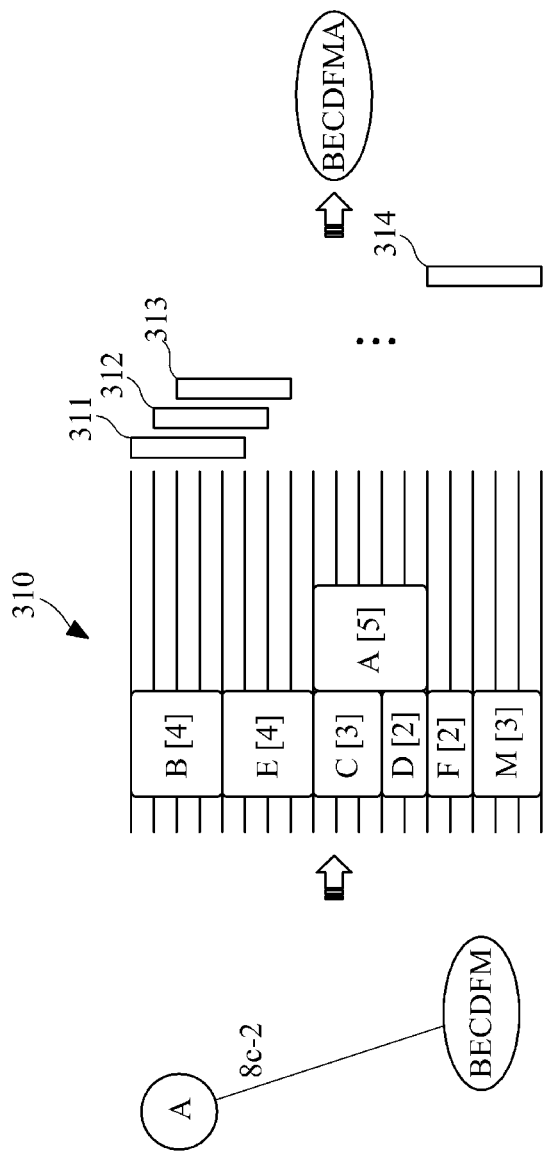

FIG. 3E $$C_{total} = \alpha \cdot \underbrace{C_{loading}}_{321} + \beta \cdot \underbrace{C_{checks}}_{322} \qquad \cdots \text{eg 1}$$

$$C_{loading} = \sum_{y \in F} S_y \times WCNC(x,y) \qquad \cdots \text{eg 2}$$

$$C_{checks} = \begin{cases} 0 & \text{if } F = 0 \\ WCNI(x) + \sum_{y \in G} WCNI(y) & \text{otherwise} \end{cases} \qquad \cdots \text{eg 3}$$

FIG. 3F

| n | Operations |
|---|---|
| Leaf | $wcni(n) = \begin{cases} 1 & \text{if } n = x \\ 0 & \text{otherwise} \end{cases}$ |
| $(n_l | n_r)$ | $wcni(n) = MAX(wcni(n_l), wcni(n_r))$ |
| $(n_l \cdot n_r)$ | $wcni(n) = wcni(n_l) + wcni(n_r)$ |
| $(n_l^*)$ | $wcni(n) = wcni(n_l) \times c$ |

APPARATUS AND METHOD FOR GENERATING CODE OVERLAY

CROSS-REFERENCE TO RELATED APPLICATION(S)

This application claims the benefit under 35 U.S.C. §119(a) of Korean Patent Application No. 10-2010-0027515, filed on Mar. 26, 2010, in the Korean Intellectual Property Office, the entire disclosure of which is incorporated herein by reference for all purposes.

BACKGROUND

1. Field

The following description relates to a code overlay technique for operating a program larger than an available memory.

2. Description of the Related Art

Most computing apparatuses are provided with storage for storing programs and memory is for loading the stored programs so that the programs may be executed. For example, in an embedded system such as a mobile phone, a firmware such as bootstrap code is stored in a storage using a NAND flash memory. Upon system boot-up, the firmware is copied to a memory, such as a static random access memory (SRAM), and the code is run.

With the increase of functions mounted on a computing apparatus, the size of programs are increasing, however, the size of a memory is often fixed. Thus, programs larger than the size of the memory may need to be executed.

For example, to run a program that is larger than the size of a memory, the size of a memory may be increased. As another example, there is a technique referred to as code overlaying, which allows a program larger than a memory to run without the use of added memory.

Using code overlaying, different code blocks of a program are placed on the same memory region, allowing a program to be larger than a memory.

However, because different code blocks use the same memory region, the number of memory copies is increased. This increase in the number of memory copies may degrade the overall performance of a system.

SUMMARY

In one general aspect, there is provided an apparatus for generating a code overlay, the apparatus comprising a graph generating unit configured to generate a static temporal relationship graph (STRG) in which each function of a program corresponds to a respective node of the STRG, and configured to generate a conflict miss value which is the maximum number of possible conflict misses between the functions, and which corresponds to an edge of the STRG, and an overlay generating unit configured to select at least one function from the STRG, calculate an allocation cost for each region of a memory based on the at least one selected function, and allocate the at least one selected function to a region having a smallest calculated allocation cost.

The graph generating unit may generate a call graph representing a call relationship between the functions of the program and convert the generated call graph to a directed acyclic graph (DAG).

The graph generating unit may calculate the conflict miss value by generating a control flow graph that represents a control flow of the functions of the program, generating a path expression that represents an execution path on the generated control flow graph as a regular expression, and applying a defined rule to the generated path expression.

The overlay generating unit may select functions corresponding to both side nodes of an edge that has a conflict miss value larger than another edge on the STRG.

The overlay generating unit may calculate the allocation cost for each region by use of at least one of the conflict miss value and a maximum prediction value of the number of possible invocations of the function.

The allocation cost for each area may include at least one of a loading cost required to load the function to a corresponding region and a checking cost required to determine whether the function is present in a corresponding region when the function is invoked.

The overlay generating unit may update the STRG if the selected function is allocated.

The conflict miss may occur when different functions are allocated to a same region of the memory and one of the different functions occupies the same region when the other of the different functions is invoked.

In another aspect, there is provided a method of generating a code overlay, the method comprising generating a static temporal relationship graph (STRG) comprising a plurality of nodes in which each function of a program corresponds to a respective node of the STRG, and comprising a conflict miss value which is the maximum number of possible conflict misses between the functions, and which corresponds to an edge of the STRG, and generating overlay by selecting at least one function from the STRG, calculating an allocation cost for each region of a memory based on the at least one selected function, and allocating the at least one selected function to a region having a smallest allocation cost.

The generating of the STRG may comprise generating a call graph representing a call relationship between the functions of the program and converting the generated call graph to a directed acyclic graph (DAG).

The generating of the STRG may comprise calculating the conflict miss value by generating a control flow graph that represents a control flow of the functions of the program, generating a path expression that represents an execution path on the generated control flow graph as a regular expression, and applying a defined rule to the generated path expression.

The generating of overlay may comprise selecting functions corresponding to both side nodes of an edge that has a conflict miss value larger than another edge on the STRG.

The generating of overlay may comprise calculating the allocation cost for each region by use of at least one of the conflict miss value and a maximum prediction value of the number of invocations of the function.

The allocation cost for each area may include at least one of a loading cost required to load the function to a corresponding region and a checking cost required to determine whether the function is present in a corresponding region when the function is invocated.

The generating of overlay may comprise updating the STRG if the selected function is allocated.

In another aspect, there is provided a code overlay generating apparatus, comprising a graph generating unit configured to generate a predetermined static temporal relationship graph (STRG) comprising a plurality of nodes each corresponding to a respective function of a program, and to generate at least a first conflict miss value between a first node corresponding to a first function and a second node corresponding to a second function, wherein the first conflict value represents the amount of possible conflict misses that could occur if the first function is stored in the same region of memory as the second function, and an overlay generating unit configured to select the first function from the STRG graph, configured to determine the cost for allocating the first function to each region of memory out of a plurality of regions of memory, and configured to allocate the function to a first region of memory out of the plurality of regions of memory based on the determined cost for allocating the function to each region of memory out of a plurality of regions of memory and based on the conflict miss value between first function and the second function.

The determined cost for allocating the first function may comprise a loading cost comprising the determined amount that it would cost to load the first function to a respective region of memory, and a checking cost comprising the determined amount that it would cost to determine whether the first function is present in the respective region of memory, when the first function is invoked.

Other features will be apparent from the following detailed description, the drawings, and the claims.

BRIEF DESCRIPTION OF THE DRAWINGS

FIGS. 2A to 2F are diagrams illustrating examples of generating a static temporal relationship graph (STRG).

FIGS. 3A to 3F are diagrams illustrating examples of determining a function allocation region.

Figure 1:
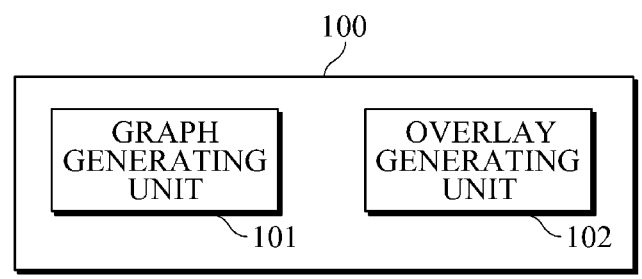
FIG. 1 is a diagram illustrating an example of an apparatus for generating a code overlay.

Throughout the drawings and the detailed description, unless otherwise described, the is same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for generating a code overlay.

Referring to FIG. 1, code overlay generating apparatus 100 includes a graph generating unit 101 and an overlay generating unit 102. For example, the code overlay generating apparatus 100 may serve as a linker or a part of a linker, which is configured to make an executable binary file by merging one or more object files.

The graph generating unit 101 generates a predetermined static temporal relationship graph (STRG). For example, in the STRG, each function or code block in a program may correspond to a node of the STRG, and a conflict miss value may correspond to an edge between nodes of the STRG. The conflict miss may represent a state in which different functions are allocated to the same region of memory, and one of the different functions is invoked when the other occupies the region. As another example, the conflict miss value may represent a memory copy incurred by such a state in which different functions are allocated to the same region of a memory.

The conflict miss value may be defined as the maximum value of the number of possible is conflict misses. For example, in FIG. 2F, node A and node B represent a function A and a function B, respectively. An edge 2c−1 between the node A and the node B represents a conflict miss value. For example, the conflict miss value may represent the maximum number of possible conflict misses between the function A and the function B. In the example of FIG. 2F, 'c' is given as a constant. A method of generating the STRG in the graph generating unit 101 is described further herein.

The overlay generating unit 102 may allocate functions of a program to regions of the memory to generate an overlay structure capable of reducing the number of conflict misses. For example, the overlay generating unit 102 may select at least one function from the STRG, may calculate an allocation cost for each region of a memory to be given when the at least one selected function is allocated, and may allocate the at least one selected function to a region that has the smallest allocation cost.

For example, the allocation cost for each area may be a weighted sum of a loading cost and a checking cost when a function is allocated to a region of the memory. In this example, the loading cost may represent the cost required to load a function to a corresponding region of the memory, and the checking cost may represent the cost to determine whether a function is present in a corresponding region when the function is invoked. For example, the loading cost may be a determination of what it would cost to load a function to a corresponding region of memory. As another example, the checking cost may be a determination of the cost for determining whether the function is present in a corresponding region. The processes of calculating the allocation cost for each region and determining an allocation region for each function in the overlay generating unit 102 are further described herein.

The overlay generating unit 102 may update the STRG when a predetermined function is allocated to the memory. For example, the overlay generating unit 102 may merge a node corresponding to a function, which is assigned an allocation position, with another node and alter the conflict miss value on the STRG.

FIGS. 2A to 2F illustrate examples of generating a static temporal relationship graph (STRG).

A method for determining a node of a STRG is described with reference to FIG. 2A.

Figure 2A:
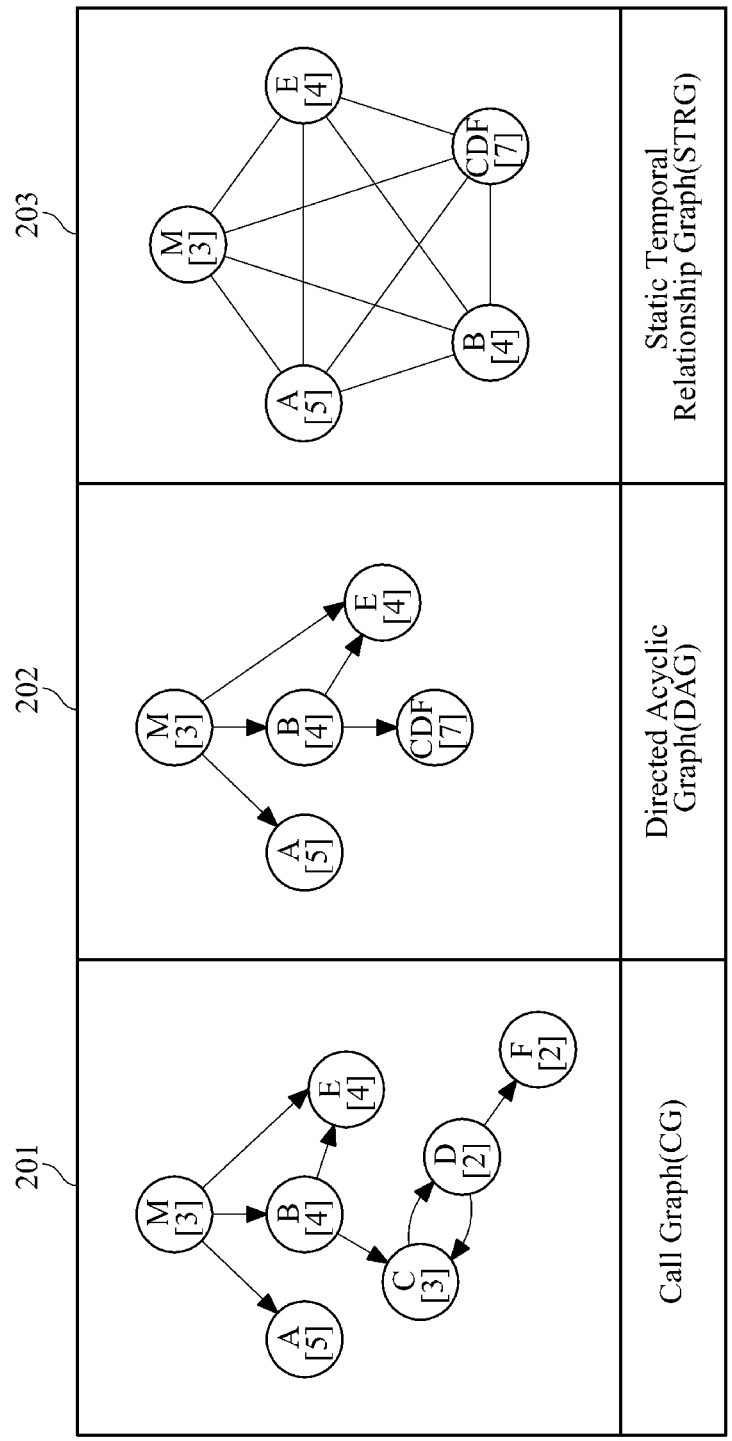

As shown in FIG. 2A, the graph generating unit 101 (shown in FIG. 1) may analyze object files for a program to generate a call graph (CG) 201 that represents the call relationship between functions of a program. In the CG 201, each node represents a function and the size of the function and an arrow between nodes represents the call relationship between functions. For example, in the CG 201, a function M calls a function A, a function B and a function E, and function M has a size of three.

The graph generating unit 101 may convert the CG 201 to a directed acyclic graph (DAG) 202. For example, the graph generating unit 101 may merge a function C and a function D which are a strongly connected component (SCC) and a function F invoked by the SCC into one node, thereby forming the DAG 202.

The graph generating unit 101 may determine the respective nodes of the DAG 202, for example, the functions M, A, B, E, and the function CDF, as nodes of the STRG 203.

A method of determining an edge of the STRG is described with reference to FIGS. 2B to 2F.

Figure 2B:
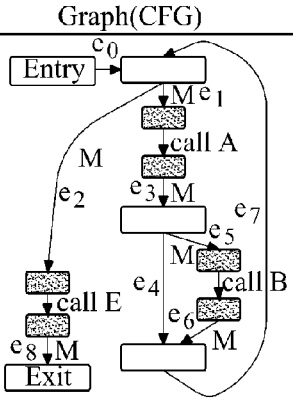
Figure 2B:
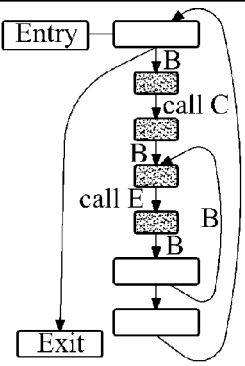
Figure 2B:
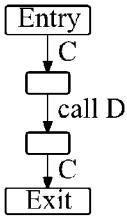

As shown in FIG. 2B, the graph generating unit 101 may acquire each path expression 204 of functions determined as the respective nodes on the STRG 203. The path expression 204 represents all the execution paths of a predetermined function from an entry to an exit of a control flow graph (CFG) 205, as a regular expression. A path expression of a predetermined function f may be expressed as $P_f$. For example, a path expression $P_M$ of a function M may be expressed as (M·A·M·((M·B·M)|ϵ))*M·E·M based on the CFG 205 of the function M. As is described above, the graph generating unit 101 may express functions determined as nodes of the STRG 203 as each CFG 205, and may acquire the path expression 204 by applying a Tarjan algorithm to the each CFG 205.

Figure 2C:
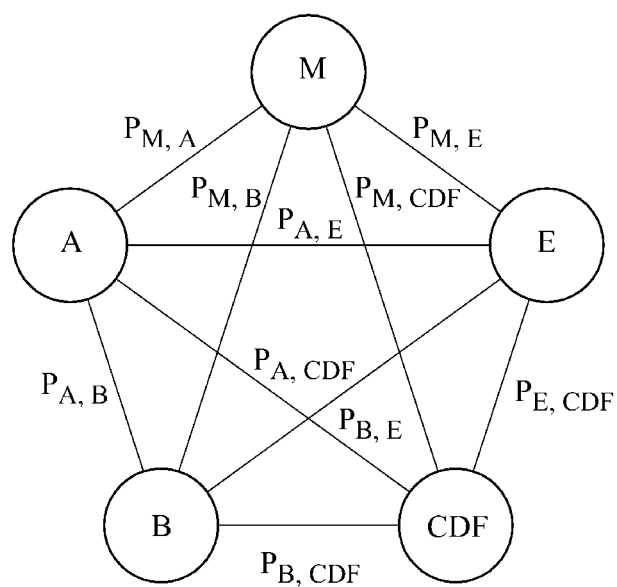

As shown in FIG. 2C, the graph generating unit 101 may acquire a path expression between functions by use of the path expression for each function. For example, a path expression $P_{x,y}$ between functions x and y represents a path expression for an entry function of the whole program, from which an invocation for functions other than the functions x and y is removed. For example, in acquiring a path expression $P_{AB}$ between a function A and a function B for an entry function M, the graph generating unit 101 may acquire a path expression (A·(B|ϵ))* as the path expression $P_{AB}$ by substituting the function A and the function B with a function ϵ in a path expression $P_M$ of the entry function M. In this manner, the graph generating unit 101 may acquire all path expressions for the whole program, that is, the path expressions between all nodes of the STRG 203.

Figure 2D:
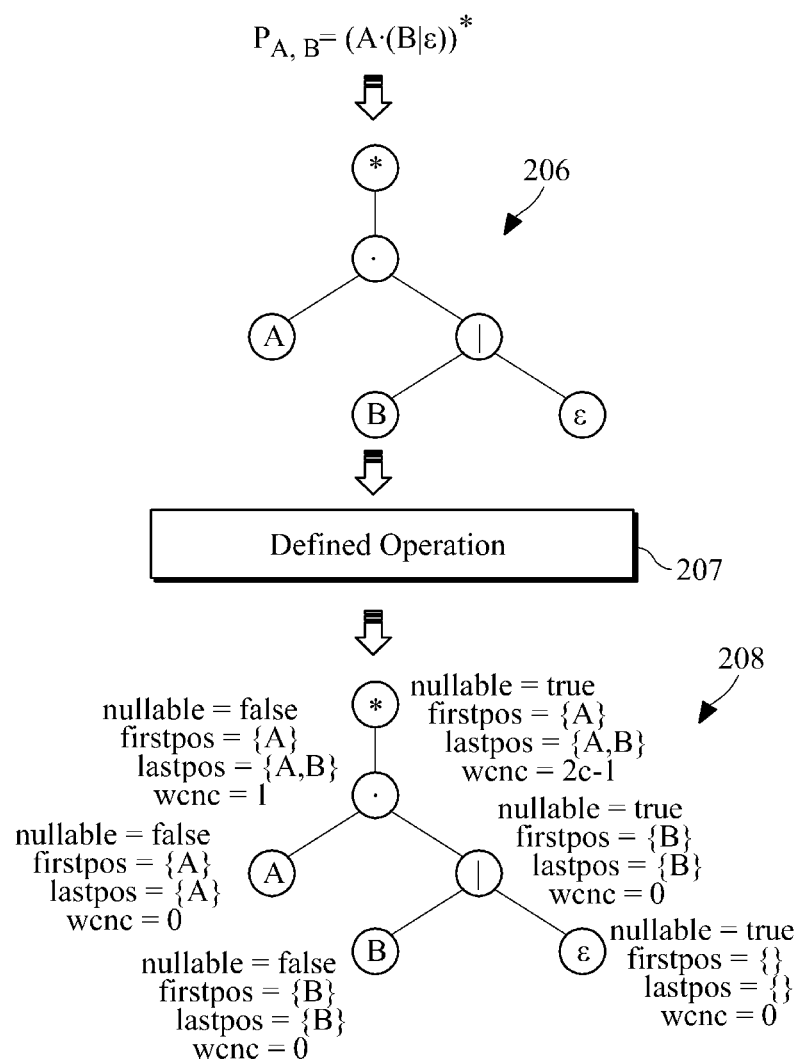
Figure 2F:
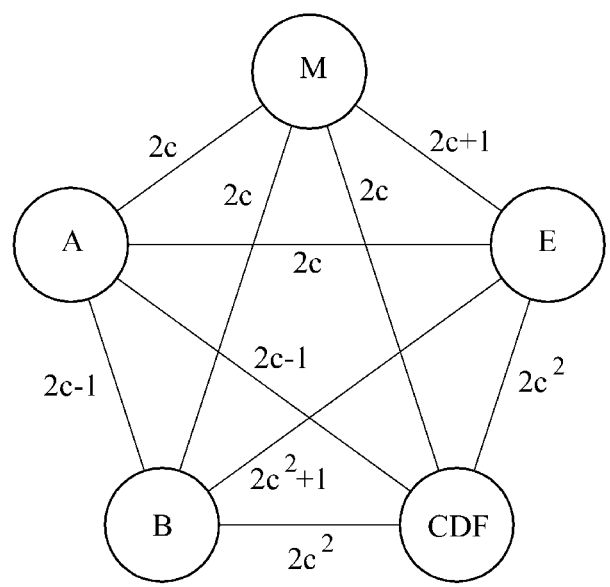

As shown in FIG. 2D, the graph generating unit 101 may calculate the conflict miss value by applying a predefined rule to the path expression between functions. In the example of a path expression $P_{A,B}$ between the function A and the function B, the graph generating unit 101 may express the path expression $P_{A,B}$ between the function A and the function B as a first syntax tree 206. The graph generating unit 101 may apply a defined rule 207 to the first syntax tree 206 to generate a second syntax tree 208. An example of the defined rule 207 is shown in FIG. 2E.

As shown in FIG. 2E, "nullable" represents whether a blank is includable in all strings expressed based on one node 'n' of a syntax tree, "firstpos" represents a set of characters that are placed at the foremost position of all strings expressed based on one node 'n' of a syntax tree, "lastpos" represents a set of characters that are placed at the last position of all strings expressed based on one node 'n' of a syntax tree, "wcnc" represents a conflict miss value, and 'c' is represents a constant related to the number of loop repetitions.

As shown in the examples of FIGS. 2D and 2E, each leaf of the syntax tree 208 has a wcnc of 0 according to a rule 1 209. Accordingly, B|ϵ has a wcnc of 0 according to a rule 2 210. A·(B|ϵ) has a wcnc of 1 according to a rule 3 211. A·(B|ϵ))* has a wcnc of 2c−1 according to a rule 4 212.

In this example, the conflict miss value for a path expression between remaining functions is calculated, and each calculated conflict miss value corresponds to each edge of the STRG 203, thereby producing STRG shown in FIG. 2F. For example, as shown in FIG. 2F, the maximum value of the number of conflict misses (i.e conflict miss value) which may be incurred when the function M and the function A are allocated to the same region of the memory is the conflict miss value 2c.

FIGS. 3A to 3F illustrate examples of determining a function allocation region. The determining of the function allocation region represents a method of generating an overlay structure in the overlay generating unit 102 to reduce the conflict misses.

Figure 3A:
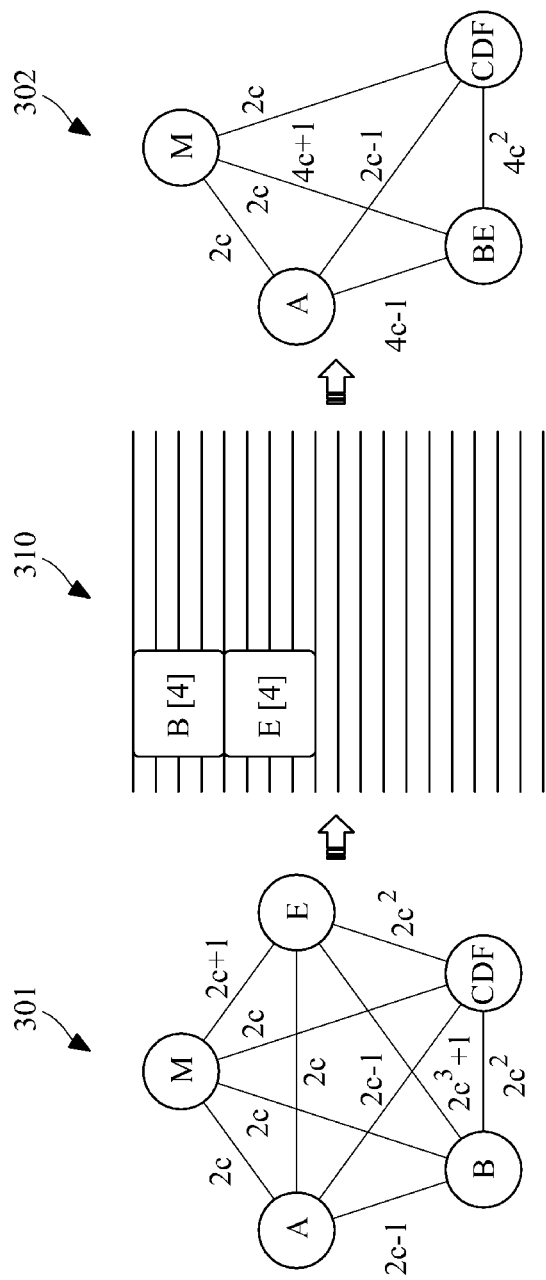

As shown in FIG. 3A, the overlay generating unit 102 may select the function B and the function E which produce the largest conflict miss value of $2c^3+1$, from a STRG 301. The overlay generating unit 102 may calculate the allocation cost for each region to be given when the function B and the function E are allocated to a predetermined region of a memory 310, and may allocate the function B and the function E to a region that has the smallest allocation cost. For example, if the memory 310 has a marginal allocation space, each region of the marginal allocation space may have the same allocation cost. The overlay generating unit 102 may sequentially allocate the selected functions B and E to an empty region of the memory 310 based on the allocation cost. After the allocation regions of the functions B and E are determined and the allocating of the functions B and E is completed, nodes corresponding to the selected functions B and E may be merged and a conflict miss value between the functions B and E may be altered, thereby converting the original STRG 301 to an updated STRG 302.

Figure 3B:
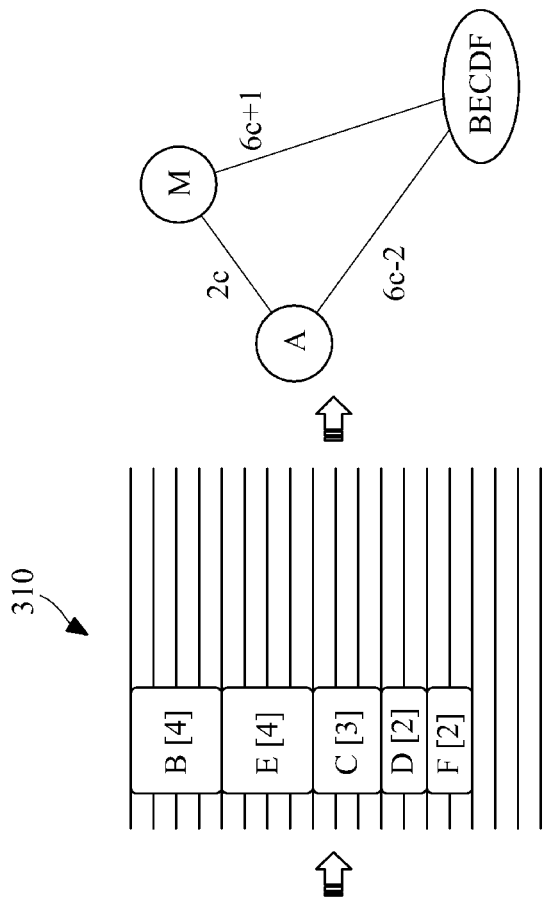
Figure 3B:
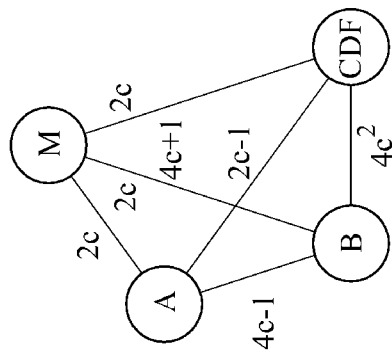
Figure 3C:
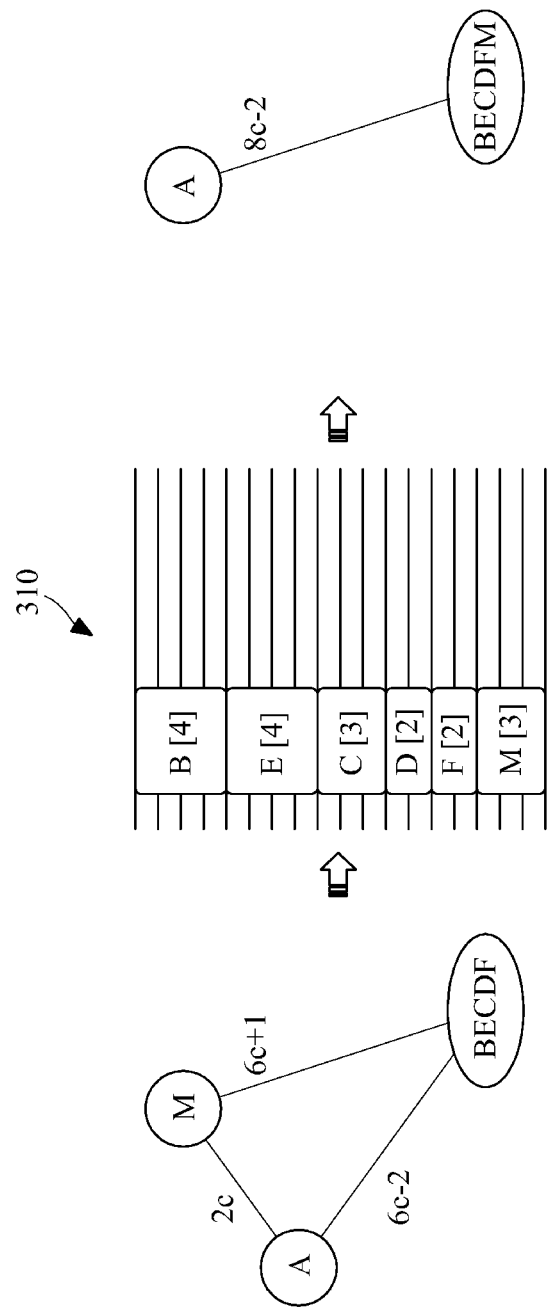

Similar to FIG. 3A, as shown in FIGS. 3B and 3C, the overlay generating unit 102 may select a function that has the largest conflict miss value, may calculate the allocation cost for each region to be given when the selected function is allocated, and may allocate the selected function to a region that has the smallest allocation cost and may update an original STRG. In FIGS. 3B and 3C, the memory 310 has a marginal allocation space and each region has the same allocation cost. In addition, each region of the marginal allocation region has an allocation cost smaller than a region allocated to other functions. Accordingly, the selected functions are sequentially allocated to the marginal allocation space.

As shown in FIG. 3D, the overlay generating unit 102 may select the function A as a function to be allocated. The overlay generating unit 102 may calculate the allocation cost for each region to be given when the function A is allocated to the memory 310. For example, if the function A has a size of '5,' the overlay generating unit 102 may calculate the allocation cost for a region of the memory corresponding to the size of '5,' that is, a first region 311, a second region 312, a third region 313, and an $n^{th}$ position 314.

For example, the allocation cost for each region may be calculated as shown in FIG. 3E. As shown in FIG. 3E, the allocation cost is defined as a weighted sum of a loading cost 321 and a checking cost 322, as expressed by equation 1.

The loading cost 321 is the cost to load a predetermined function x and expressed as equation 2. In equation 2, WCNC (x, y) represents the conflict miss value between functions x and y, and S represents the overlapping size between the functions x and y. Also, F represents a set of functions sharing the same memory with the function x.

The checking cost 322 is the cost to determine whether a function x is present in a memory when the function x is invoked, and expressed as equation 3. In equation 3, WCNI (x) represents the maximum value of the number of possible invocations of the function x when a program is running, and G represents a set of functions sharing the same memory with the function x.

The value of WCNI in equation 3 is obtained by applying a predetermined rule similar to those shown in FIG. 2E to a syntax tree of a path expression of a whole program, and the predetermined rule is shown in FIG. 3F.

For example, as shown in FIGS. 3D to 3F, the overlay generating unit 102 may place the function A in an overlaying structure due to the lack of space in the memory 310. In this example, as shown in FIG. 3E, the overlay generating unit 102 may calculate the allocation cost for each of the first region 311, the second region 312, the third region 313, and the $n^{th}$ region 314, and may allocate the function A to a region that has the smallest allocation cost. The maximum value of the number of possible invocations of the function A that is used to calculate the allocation cost is obtained by applying the rules shown in FIG. 3F to the path expression.

Figure 4:
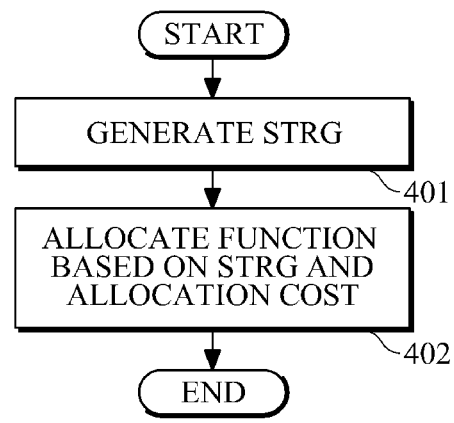
FIG. 4 is a diagram illustrating an example of a method of generating a code overlay.

FIG. 4 illustrates an example of a method of generating a code overlay.

As shown in FIGS. 1 and 4, in 401 the code overlay generating apparatus 100 generates a STRG by analyzing object files. For example, the graph generating unit 101 may determine a node by converting a call graph of the STRG, which represents the call relationship between functions of a program, to a DAG. The graph generating unit 101 may determine an edge of the STRG by calculating a conflict miss value between functions based on a path expression which represents an execution path on a control flow graph. For example the control flow graph may represent a control flow of functions of a program, as a regular expression.

The code overlay generating apparatus 100 allocates a function to a predetermined region of a memory based on the generated STRG and the allocation cost for each region of the memory, in 402. For example, as shown in FIGS. 3A to 3F, the overlay generating unit 102 may select a function to be allocated based on the conflict miss value, may calculate the allocation cost for each region to be given when the function is allocated based on the conflict miss value and the maximum invocation value, may determine the allocation position such that the function is allocated to a region that has the smallest allocation cost, and may update the STRG.

As described herein, the code overlay generating apparatus 100 generates the overlay structure using the STRG based on the number of conflict misses and the allocation cost. Accordingly, the number of possible conflict misses is reduced and operational performance is improved with a relatively small memory.

Described herein is a method and apparatus for reducing the number of conflict misses between functions when multiple functions of a program are stored in the same region of memory. For example, multiple functions of a program may need to be stored in the same region of memory because the number of functions may exceed the number of available regions of memory.

The apparatus and method described herein may generate a predetermined static temporal relationship graph (STRG). The STRG may include a plurality of nodes. Each node may correspond to a respective function of a program. Between each pair of nodes, the graph may include a conflict miss value. The conflict miss value can be used to represent the number of potential misses that may occur when the functions, which correspond to the two nodes in the pair, are stored in the same region of memory.

The apparatus and method may also estimate, or otherwise determine, what it would cost to allocate a function to a region of memory. This estimate may be performed for a plurality of regions. Accordingly, the apparatus and method may determine a region of memory out of the plurality of regions, to store a function. For example, the apparatus and method may determine to store a function in a region of memory based on the conflict misses of that function and the corresponding surrounding functions on the STRG, and based on the determined cost for allocating the function to each region of memory.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like.

The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer implemented method of generating a code overlay, the method comprising:
    generating a static temporal relationship graph (STRG) comprising nodes in which functions of a program are indicated by respective nodes of the STRG, and comprising a conflict miss value that is
        a maximum number of possible conflict misses between the functions,
        represented by an edge of the STRG, and changed in response to allocating the functions to a common region of a memory; and
selecting a function from the STRG;
calculating an allocation cost for each of regions of the memory based on the selected function; and
allocating the selected function to a region comprising a smallest allocation cost among the regions to generate the code overlay,
wherein generating the STRG includes:
generating a call graph representing a call relationship between the functions of the program;
converting the generated call graph to a directed acyclic graph (DAG) by merging functions which are strongly connected components (SCC) and functions invoked by the SCC into one nodes; and
determining each node of the DAG to be a node of the STRG.

2. The method of claim 1, wherein the generating of the STRG comprises:
generating a control flow graph representing a control flow of the functions of the program;
generating a path expression representing an execution path of the generated control flow graph as a regular expression; and
applying a defined rule to the generated path expression to generate the conflict miss value.

3. The method of claim 1, wherein the selecting of the function comprises:
selecting functions represented by respective side nodes of an edge of the STRG that comprises a conflict miss value greater than a conflict miss value of another edge of the STRG.

4. The method of claim 1, wherein the calculating of the allocation cost comprises:
calculating the allocation cost for each of the regions based on the conflict miss value and/or a maximum prediction value of a number of invocations of the selected function.

5. The method of claim 1, wherein the calculating of the allocation cost comprises:
calculating the allocation cost for each of the regions based on a loading cost to load the selected function to a respective region of the memory and/or a checking cost to determine whether the selected function is present in the respective region in response to the selected function being invoked.

6. The method of claim 1, further comprising:
updating the STRG in response to the selected function being allocated.

7. An apparatus configured to generate a code overlay, the apparatus comprising:
a graph generating unit stored in a non-transitory computer storage medium and configured to
generate a static temporal relationship graph (STRG) in which functions of a program are indicated by respective nodes of the STRG, and
generate a conflict miss value that is
a maximum number of possible conflict misses between the functions,
represented by an edge of the STRG, and
changed in response to allocating the functions to a common region of a memory; and
an overlay generating unit stored in the non-transitory computer storage medium and configured to:
select a function from the STRG,
calculate an allocation cost for each of regions of the memory based on the selected function, and
allocate the selected function to a region comprising a smallest calculated allocation cost among the regions,
wherein the graph generating unit is configured to:
generate a call graph representing a call relationship between the functions of the program;
convert the generated call graph to a directed acyclic graph (DAG) by merging functions which are strongly connected components (SCC) and functions invoked by the SCC into nodes; and
determine each node of the DAG to be a node of the STRG.

8. The apparatus of claim 7, wherein the graph generating unit is configured to:
generate a control flow graph representing a control flow of the functions of the program;
generate a path expression representing an execution path of the generated control flow graph as a regular expression; and
apply a defined rule to the generated path expression.

9. The apparatus of claim 7, wherein the overlay generating unit is configured to:
select functions represented by respective side nodes of an edge of the STRG that comprises a conflict miss value greater than a conflict miss value of another edge of the STRG.

10. The apparatus of claim 7, wherein the overlay generating unit is configured to:
calculate the allocation cost for each of the regions based on the conflict miss value and/or a maximum prediction value of a number of possible invocations of the selected function.

11. The apparatus of claim 7, wherein the overlay generating processor is configured to:
calculate the allocation cost for each of the regions based on a loading cost to load the selected function to a respective region of the memory and/or a checking cost to determine whether the selected function is present in the respective region in response to the selected function being invoked.

12. The apparatus of claim 7, wherein the overlay generating unit is configured to:
update the STRG in response to the selected function being allocated.

13. The apparatus of claim 7, wherein a conflict miss occurs in response to different functions being allocated to a same region of the memory and one of the different functions occupying the same region when another of the different functions is invoked.

14. A code overlay generating apparatus, comprising:
a graph generating unit stored in a non-transitory computer storage medium and configured to
generate a predetermined static temporal relationship graph (STRG) comprising nodes indicative of respective functions of a program, and
generate a conflict miss value between a first node indicative of a first function and a second node indicative of a second function,
wherein the conflict miss value is
a maximum number of possible conflict misses between the first function and the second function,
represented by an edge of the STRG, and
changed in response to allocating the functions to a common region of a memory; and
an overlay generating unit stored in the non-transitory computer storage medium and configured to
select the first function from the STRG graph, determine a cost of allocating the first function to each of regions of the memory, and allocate the first function to a first region of the memory among the regions based on the determined cost of allocating the first function to each of the regions, wherein the graph generating unit is configured to:

generate a call graph representing a call relationship between the functions of the program;

convert the generated call graph to a directed acyclic graph (DAG) by merging functions which are strongly connected components (SCC) and functions invoked by the SCC into nodes; and determine each node of the DAG to be a node of the STRG.

15. The code overlay generating apparatus of claim 14, wherein the overlay generating unit is configured to:

determine the cost of allocating the first function to each of the regions based on a loading cost to load the first function to a respective region of the memory, and a checking cost to determine whether the first function is present in the respective region in response to the first function being invoked.

16. The apparatus of claim 8, wherein the graph generating unit is configured to:

generate a path expression of an entry function, among the functions, which represents an execution path of the generated control flow graph from the entry function to another function, among the functions, back to the entry function.

17. The apparatus of claim 16, wherein the graph generating unit is configured to:

remove, in the path expression of the entry function, an invocation for other functions other than first and second functions, among the functions, to generate a path expression between the first and second functions.

18. The apparatus of claim 17, wherein the graph generating unit is configured to:

express the path expression between the first and second functions as a syntax tree; and apply a defined rule to the syntax tree to generate a conflict miss value between the first and second functions.

19. The apparatus of claim 11, wherein the overlay generating unit is configured to:

calculate the loading cost based on a product of the conflict miss value and an overlapping size between the functions.

20. The apparatus of claim 11, wherein the overlay generating unit is configured to:

calculate the checking cost based on a sum of a maximum value of possible invocations of all functions sharing the respective region.

21. The apparatus of claim 7, wherein, in response to the overlay generating unit determining two functions with the largest conflict miss values on the STRG, the overlay generating unit is configured to sequentially allocate both of the functions to an empty memory space based on an allocation cost.

* * * * *